Aug. 1, 1961  G. D. BECKER ET AL  2,994,431
SCREEN AND VIBRATING MEANS THEREFOR
Filed Oct. 16, 1957  6 Sheets-Sheet 1

INVENTORS:
GEORGE D. BECKER
KEITH LOWE
BY
Parker and Carter
Attys.

FIG. 3a

INVENTORS.
GEORGE D. BECKER
KEITH LOWE
BY Parker and Carter
Att'ys.

United States Patent Office 2,994,431
Patented Aug. 1, 1961

2,994,431
SCREEN AND VIBRATING MEANS THEREFOR
George D. Becker, Wauwatosa, and Keith B. Lowe, Milwaukee, Wis., assignors to Nordberg Manufacturing Company, Milwaukee, Wis., a corporation of Wisconsin
Filed Oct. 16, 1957, Ser. No. 690,456
4 Claims. (Cl. 209—367)

Our invention relates to a compact, efficient screen assembly or the like whereby a predetermined magnitude and direction of vibration may be imparted to the screen in order to produce a vibratory motion useful in classifying, sorting and many other processes in which a vibratory motion is utilized. Essentially, a vibrator assembly or actuator is mounted on the member in which the vibratory motion is to be produced. This vibratory assembly or actuator is composed basically of a pair of weights which are rotated in opposite directions about a common axis by means of a suitable pair of bevel gears integral with the weights and interconnected by a pinion gear. Upon rotation of the weights an alternate coincidence and balancing of force will be produced twice in every complete rotation. By mounting the actuator on the screening or similar member, the intermittently coincidental force of the weights is imparted to the screen member to cause it to vibrate in a predetermined manner.

For the purpose of our description, we will consider a screen to represent generically a free body which we define as a body that, when not subjected to any external force, will react to the influence of gravity only.

Vibratory screens, feeders and similar mechanisms have been in use for many years and while some of them have given excellent service, many of them have proved impractical for reasons of complexity of design and operation, basic mechanical imperfections or uncontrollable motion. There has been a great need for many years for a unit that is compact, simple and inexpensive to manufacture with a minimum of moving parts and is at the same time easily assembled and operated. To build all of these qualities into one assembly which incorporates the high degree of flexibility dictated by the varied demands and diversified applications in industry has been the prime object of our invention.

Another object is the provision of a free body, such as a screening assembly or the like, wherein the actuators are easily interchangeable to thus provide a maximum degree of flexibility and where two or more vibrator units may be connected to the same power source, in order to produce vibrations of varying amplitude in the free body at the same time.

Another object is to provide a screen assembly or the like which may be so adjusted as to have a uniform controlled motion or a motion which may be of constantly changing amount, either increasing or decreasing in amplitude or direction, or a constantly varying motion.

While our invention will be illustrated and described for use in connection with a screen or feeder, we contemplate that it is capable of a much wider use. For example, it is entirely within the scope of our invention to utilize it in the operation of conveyers, feeder pans, such as are used in industry for transferring a given amount of material from one work station to another, bin shakers, car shakers, tampers, foundry shakeouts or the like. Our device has further application in all types of scalping and sizing operations and has particular utilization in the area of mine screening for use in separating and classifying rock and ores. Basically, the devices which may embody our invention may be generically classed as free bodies as we have defined them above.

Another object is the provision of a screen assembly or the like in which the assembly is capable of quick replacement in changing from one form of motion to another thus necessitating a minimum amount of down time, and a minimum of replacement and labor expenses.

Other objects will become apparent during the course of the specification and claims.

We illustrate our invention more or less diagrammatically in the following figures wherein:

FIGURE 2 is a view of the actuator taken along the line 2—2 of FIGURES 3 and 3a;

Figure 1:
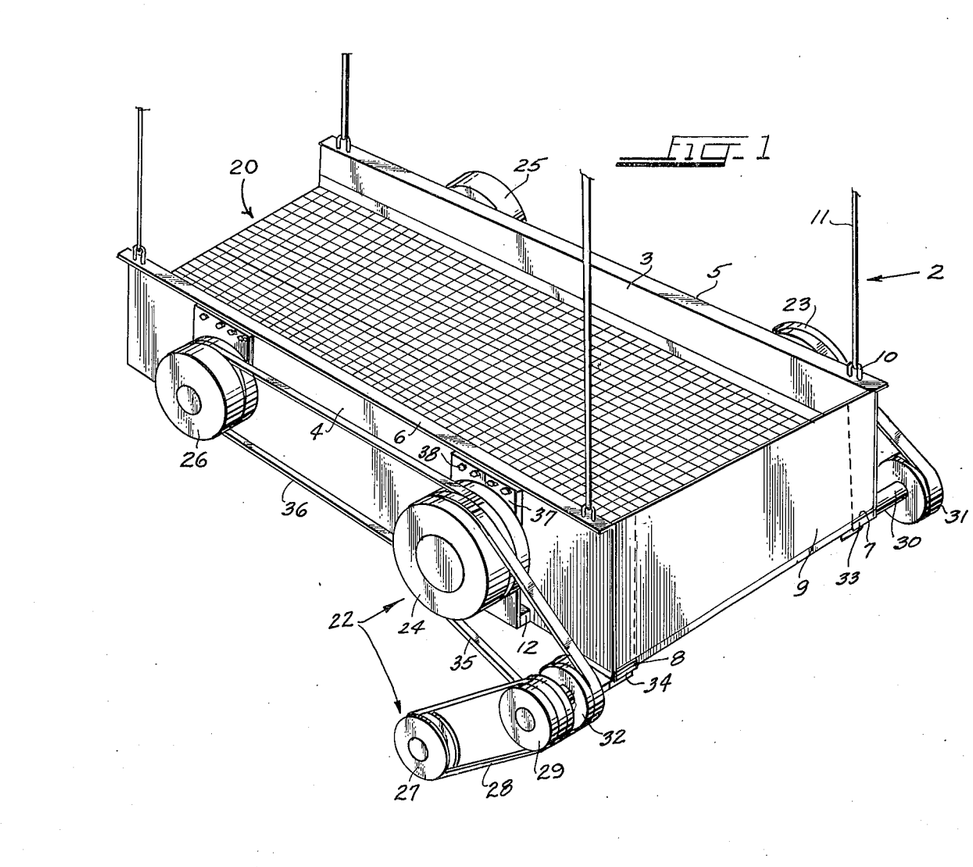
FIGURE 1 is a perspective view of our invention showing a multiple series of actuators synchronously connected and attached to the same screen and operated from the same power source.

Referring to FIGURE 1, an embodiment of our invention is shown as a vibratory screen assembly. The screen assembly is indicated generally at 2 and an actuator and power source is indicated generally at 27.

The screen assembly 2 is shown as comprised of a pair of side frames 3 and 4 having outwardly directed top flanges 5 and 6 respectively and inwardly directed bottom flanges 7 and 8. We have shown an end plate 9, the provision of which is optional. If a conveying effect is desired, the opposite end will normally be open and disposed over a suitable receptacle or other conveying means.

Suitably connected to the upper flanges 5 and 6 are U-bolts or like connections 10. Suitable suspension members 11 are indicated diagrammatically as extending between U-bolt members 10 and a fixed support (not shown). Suspension members 11 may be connected to a set of springs which are in turn attached to the fixed support, or they may themselves be springs. The various details of the structure of the frame and suspension assembly may be varied widely without departing from the scope of the invention. At 12 we have indicated a series of blocks or projecting members connected to the side frames 3 and 4 for a purpose which will be described hereinafter.

The screen 20 may be of any suitable size or shape and its construction and arrangement does not of itself constitute our invention. For example, it will frequently be advantageous to incline the screen from one end of the frame to the other or to superimpose a second screen over the feed end of the screen in order to promote the wear-life of the main screen 20. For an illustration of one of the many types of variations possible see Patent No. 2,192,279, issued March 5, 1940.

At 22 we have shown a vibrator and power drive unit consisting essentially of (in this instance) four actuators 23, 24, 25 and 26 rigidly connected to frame members 3 and 4, and a source of power at 27.

The power source 27 is suitably connected by any mechanical linkage such as a cog belt, V-belt, or chain drive 28 to a sheave or driving pulley 29. Driving pulley 29 is shown connected to a countershaft 30 which we have illustrated as extending completely across the width of our screen assembly. Power take-off or timing pulleys 31 and 32 are integrally fastened to the shaft. The power take-off pulleys and power shaft are suitably carried by the frame and suspension assembly by means of bearing assemblies 33 and 34 which may include pillow blocks, illustrated diagrammatically only.

Referring now to the arrangement of vibrators 24 and 26, a suitable timing belt 35 is shown as extending between power take-off pulley 32 and vibrator assembly 24. A second timing belt 36 is shown extending between the inner portion of actuators 24 and 26. Actuator 24 is rigidly connected to side frame 4 through the provision of a fixed stub shaft 42 (shown best in Figures 3 and 3a) integrally connected with a fastening plate 37 on the free body which in turn is fastened to projecting members 12 by securing members such as the bolts 38. It will be understood that vibrator assemblies 23, 24, 25 and 26 are of generally similar construction and adapted for location upon the side frames 3 and 4 in a similar manner. Likewise, although a total of four have been shown, it is entirely within the scope of our invention to utilize a greater or lesser number either on one side or both sides as the workload conditions vary.

Figure 3:
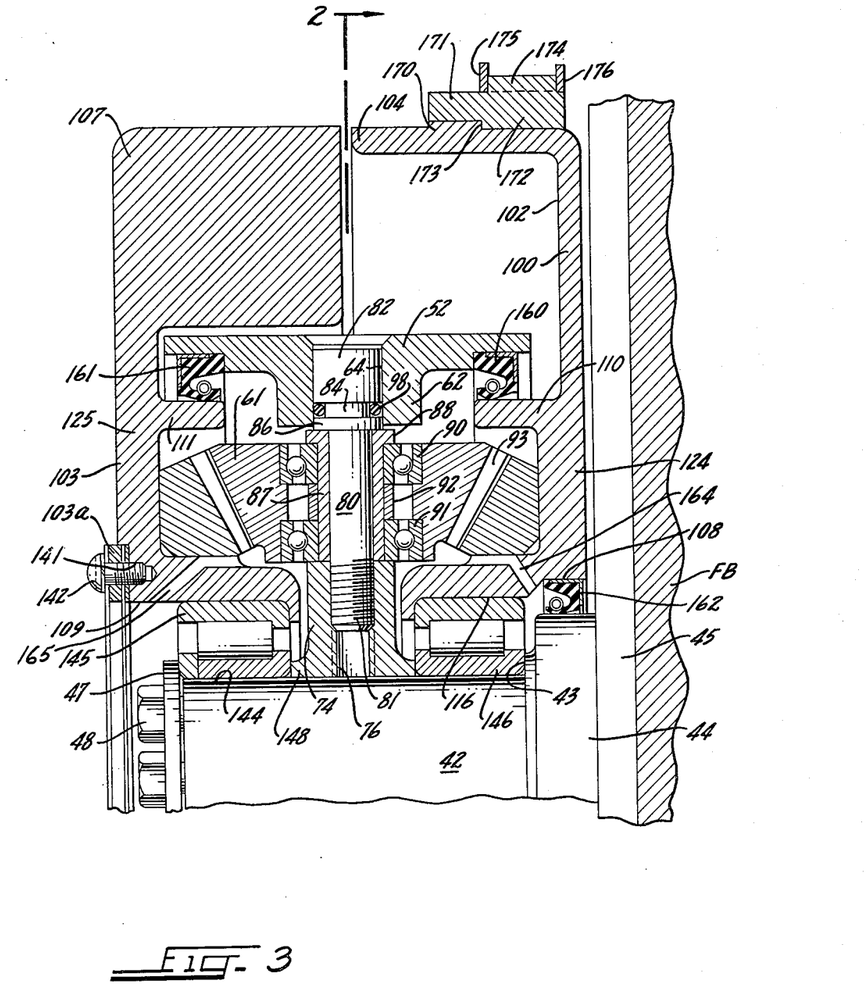
FIGURE 3 is a sectional view of the top half of FIGURE 2 taken on the line 3—3 of FIGURE 2.
Figure 3A:
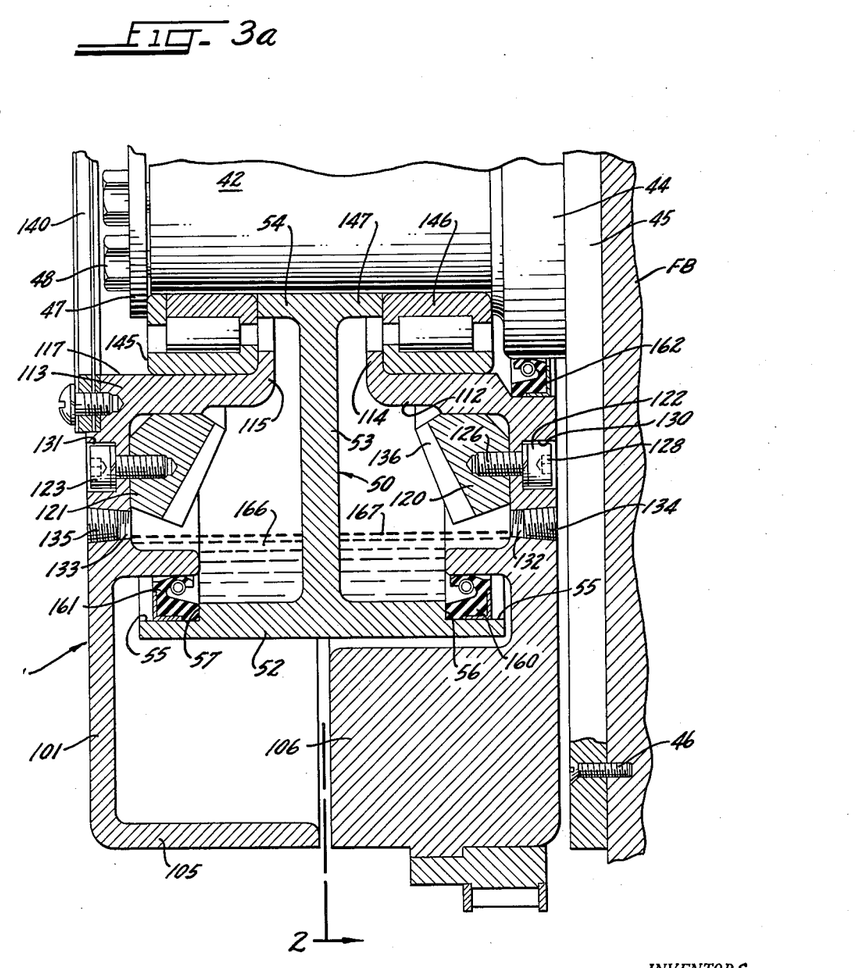
FIGURE 3a is a sectional view of the bottom half of FIGURE 2 taken on the line 3—3 of FIGURE 2.

Referring more particularly now to Figures 3 and 3a, 1 indicates generally our self-contained variable actuator. 42 is a fixed common stub shaft or gudgeon about which the weights rotate. The stub shaft 42 is integral with a gudgeon plate 45 which in turn is mounted to the side frame, or any suitable portion of any free body FB such as the blocks 12, through suitable securing and fastening means such as bolts 46. At the inner or righthand end of the common shaft as viewed in Figure 1, an annular shoulder 43 is formed for a purpose to be hereinafter inscribed, and between the annular shoulder 43 and the gudgeon plate 45 is an annular base 44. At the outer or lefthand end of the stub shaft is a bearing mounting plate or hub cap 47 rigidly connected to the stub shaft 42 through the provision of bolts 48 threaded into tapped holes in the shaft. Any suitable number may be employed but we find that four is sufficient for a secure connection, and at the same time requires a minimum amount of effort during replacement operations.

Rigidly connected to the stub shaft 42 is a pinion spider or central mounting disk indicated generally at 50. The spider is connected to the stub shaft by any suitable means such as a key 51 shown in Figure 2. It should be understood however that any suitable connecting means may be employed and we contemplate that set screws for example may be used. The spider consists essentially of an outer circular flange 52, an integral sleeve 54, and a connecting web 53 between the two flanges. The sleeve 54 may be of any suitable dimension but must be large enough to accommodate the key 51 in order to provide a rigid connection to the stub shaft 42. The outer circumferential flange 52 is somewhat greater in thickness and its outside edges are notched at 55 in order to provide a pair of annular shoulders 56 and 57.

Outer circumferential flange 52 is shown as having a pair of projecting hubs 62 and 63 with a smooth bore 64 and 65 located respectively therein. The web 53 is cut away roughly in a butterfly design as shown most clearly in Figure 2 at 68 and 69. Each cut away portion is in the form of a pair of wings indicated at 70 and 71 lying on each side of a trapezoidal area.

Near the sleeve 54 a pair of radially disposed sockets 73 and 74 are oppositely located with respect to projecting hubs 62 and 63. Suitable bores 76 and 77 are drilled and threaded in sockets 74 and 73 and disposed in alignment with the openings 64 and 65 in the projecting hubs 62 and 63. The openings 64 and 65 are considerably larger than the bores 76 and 77. A pinion shaft 80 is adapted to enter bores 64 and 76 and is provided with a suitable threaded portion 81. The pinion shaft 80 consists of an enlarged head 82 adapted to be slidably received in bore 64 with a slot 83 for engagement with a suitable operating tool. A shank portion 84 reduced in diameter from head 82 is formed at the base of head 82 and the remainder of pinion shaft 80 is of a diameter suitable for entry into bore 76 and similarly reduced in diameter from shank portion 84.

A pinion 61 is rotatably carried on the ball bearings 90 and 91 located rigidly axially on bushing 87, said bearings being located axially on bushing 87 by means of collar 88 and spacer 92. The bushing 87 is rigidly held to the hub 62 by means of the shoulder 86 on the shaft 80 through screw threads 81 disposed at the end of shaft 80 and suitably fitted to 76. The end of the shaft 80 has a head 82 rotatably fitted in the opening 64 in the projecting hub 62. This close fitting head is grooved at 84, for the acceptance and holding of a rubber O ring 98 disposed within this groove 84 so tightly as to seal the opening between 64 and 65 and the head 82. The end surface of the head 82 is slotted at 83 for use of a suitable tool for tightening the threads 81 in 76 and 77. The pinion 61 is provided with suitable gear teeth 93 diagrammatically shown in engagement with bevel gear 120 through teeth 136.

The internal bore 94 of pinion 61 is notched as at 95 and 96 and adapted to receive angular contact bearing 90 and single row ball bearing 91 respectively. The bore 94 is of a length equal to the spacer element 92 so that when assembled the ball bearings 90 and 91 will be maintained at exactly a 90° relationship with respect to the axis of pinion securing member 80. A suitable washer and sealing element 98 is disposed around the shank portion 84 between the head 82 and the washer 86 of the pinion member 80.

Figure 2:
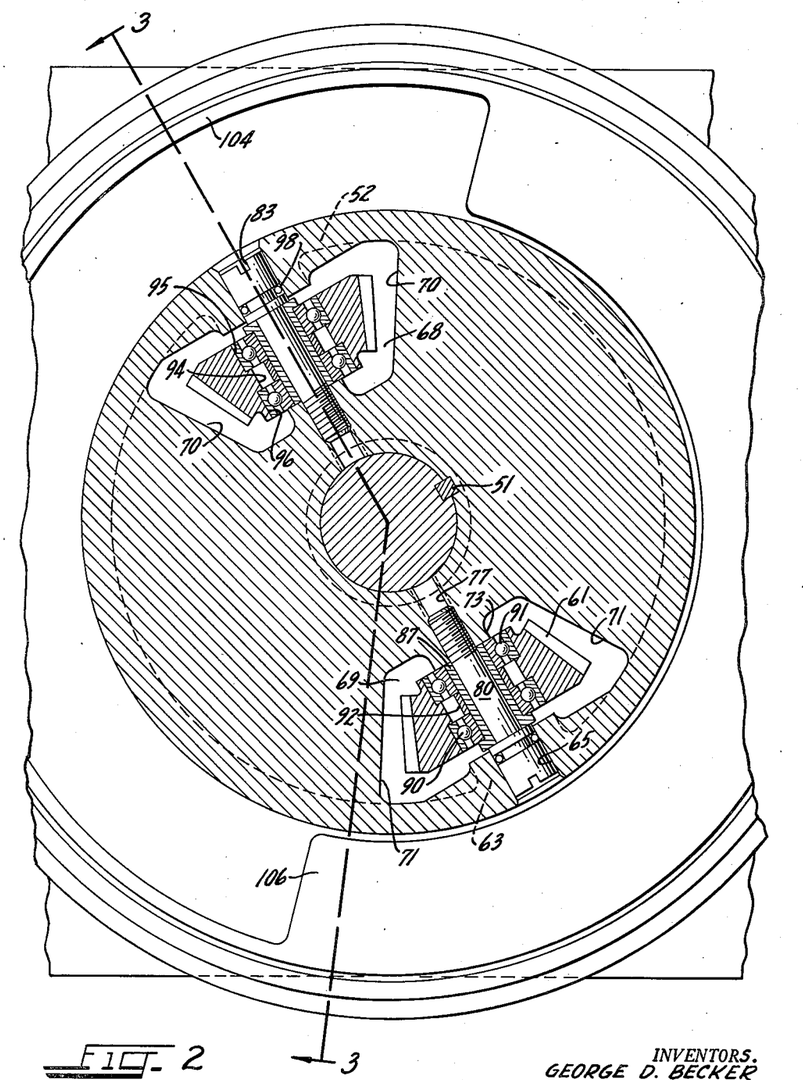

Disposed revolvably with respect to the stub shaft 42 are a pair of flywheels 100 and 101. Flywheel 100 is composed of a face portion 102 and an external flange 104. External flange 104 is semi-continuous around a circumferential portion of flywheel 100 as is best seen in FIGURE 2. A portion of the flange is made integral with weight 106 which serves when rotated to produce the vibratory motion. As shown in the figures the weight 106 is integral with the flange 104 and the flywheel 100, but we consider it to be entirely within the scope of our invention to form the weight 106 as a separate element attachable through suitable connections to the interface 102 or flange 104. Thus, for example, by making the weight 106 a separate element and threading a series of holes in flange 104, it would be possible to dispose weight 106 at any desired position around the circumference of the member 100 by aligning the holes in the flange 104 with suitable holes on the backside of weight 106.

Flywheel 100 is formed with a circular bore 108 adapted to encircle annular base 44 of the stub shaft 42 with a suitable clearance therebetween. Between the bore 108 and inner surface of flange 104 an internal projection 110 extends in a circumferential manner. Projection 110 is located at a distance from the axis of rotation less than the notched portion 55 of the flange 52. A second somewhat longer projection is formed at 112 with an inturned outer end 114. The projection 112 is machined on its inside surface as at 116 to provide a race for suitable rollway bearings. Located between projections 112 and 110 is a bevel gear 120 which is rigidly connected with flywheel 100 by connecting bolts 122 disposed within the thickened wall portion 124 of flywheel 100. The bolts 122 are threaded through the thickened wall portion 124 and into suitable receiving holes 126 in the bevel gear 120. The heads 128 of the bolts are disposed within recesses 130 a distance far enough so that there is no projection beyond the innerface 102 of the flywheel 100. One or more washers may be used and we have found the conventional Allen head bolt to be entirely satisfactory. Drain passages 132 are formed in the thickened wall portion 124 with drain plugs 134 disposed therein for a purpose to be described hereinafter. Bevel gear 120 is formed with a series of engaging teeth 136 illustrated diagrammatically as meshing with the corresponding teeth 93 on the pinion 61.

Flywheel 101 is similar in construction to flywheel 100. Thus a flange 105 forms the circumferential outer portion of flywheel 101 with a weight 107 similar to weight 106 disposed at one side thereof. An outer shaft assembly receiving bore is shown at 109. An internal circular projection 111 is formed between the flange 105 and an internal projection 113 which is similar to the projection 112. Projection 113 has its end turned in as at 115 and its internal surface is machined as at 117 to provide a race for suitable bearings to be described hereinafter. Surface 117 extends outwardly almost to the outer surface of face 103 of the flywheel 101, the surface 103 having a notch 103a formed therein. A bevel gear 121 is positioned between projections 111 and 113 by means of suitable fastening members 123 set in recesses 131 in the thickened wall portion 125. Suitable washers may be employed and the bolts 123 may be similar to bolts 112. A drain passage 133 is located opposite drain passage 132 and has drain plug 135 therein.

A plate 140 is disposed on the outside surface face 103 and serves to form a seal completing the outer portion of the flywheel 101. Flywheel 101 has suitable threaded holes 141 in which bolts 142 extending through plate 140 are received. Any suitable number of bolts may be employed that will securely fasten plate 140 to flywheel 101 and yet facilitate easy replacement of parts.

Stub shaft 42 is accurately machined on its outer surface 144. Disposed around its outer surface 144 and located between the projections 113 and 112 of the flywheels 101 and 100 is a series of rollway bearings 145 and 146. Bearings 146 are held in snug engagement between righthand end 147 of inner circular flange 54 and the annular shoulder 43 on the fixed shaft 42 and the projection 112 with its inturned end 114. Bearings 145 are fixedly held in place by the lefthand end 148 of the sleeve 54, the bearing mounting plate or hub cap 47 and the projection 113 with its inturned portion 115.

Our variable actuator has a self-contained closed oil system including circumferential oil seals 160 and 161 disposed between the outer shoulders 56 and 57 of the outer circumferential flange 52 and the projections 110 and 111, of the flywheels 100 and 101. Annular circumferential bearing seal 162 is disposed between the annular base 44 and the passage 108 on the righthand flywheel 100. The circumferential O-ring seal 98 completes the closed oil system. Projecting portions 112 and 113 have oil connecting holes 164 and 165 disposed therein respectively. A quantity of oil shown at 166 may be maintained in the oil system and in the at rest position shown the static oil level is indicated at 167.

Flywheel 100 has a projection 170 circumferentially disposed approximately midway between its edges. A ring 171 having an offset portion 172 is adapted to slide over flywheel 100 and the notched portion 173 of ring 171 is adapted to engage projection 170 and to be securely fastened thereto by any suitable means, such as welding. An outer upstanding portion 174 is shown integral with main body portion 171. In the embodiment shown outer portion 174 may be duplicated as a series of teeth extending around ring 171 suitable for engagement with a chain drive from any suitable power source. Guide rings 175 and 176 are disposed at the outside edges of projections 174 in order to prevent lateral movement of a suitable drive chain capable of engagement with the projections or teeth.

Although a driving connection has been shown on one flywheel only, it is entirely feasible to form a similar connection on the companion flywheel in order to transmit power from the companion to another actuator assembly located some distance away on the same free body. Indeed, when the offset portion 172 is cast integrally with the flywheel, the economics of production will require that a driving connection be formed in the outer or companion flywheel whether other actuators are intended to be used or not.

Figure 4:
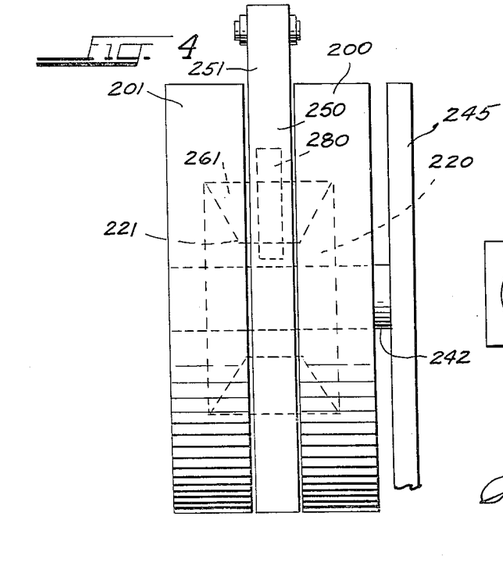
FIGURE 4 is a side view diagrammatic in form of another embodiment of our invention.
Figure 5:
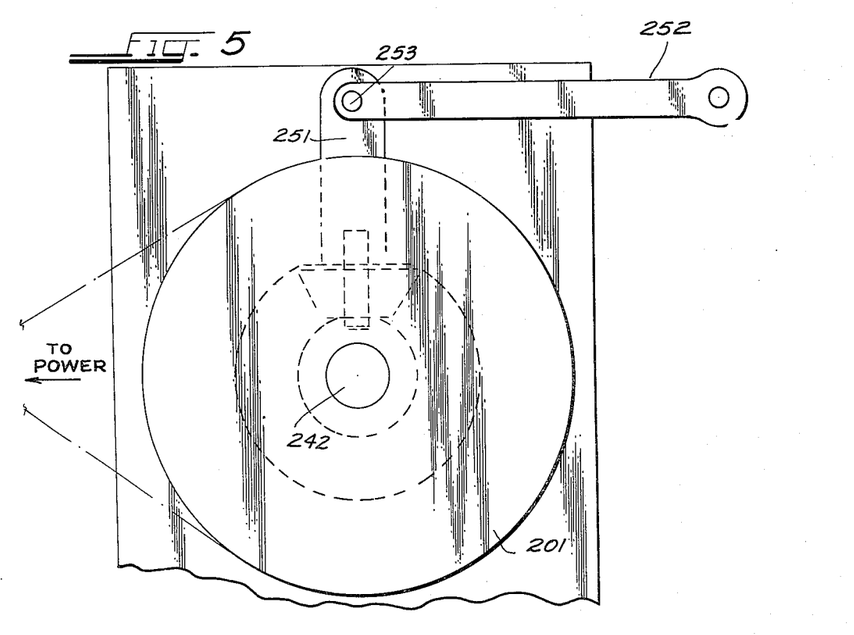
FIGURE 5 is a front view also diagrammatic in form of the same embodiment.

Another embodiment of our invention is described in FIGURES 4 and 5 in which parts corresponding to those shown in FIGURES 2, 3 and 3a are indicated with a prefix of 200 wherever possible. These views are diagrammatic in form and it will be understood that their details are the same as that of the embodiment shown in FIGURES 2, 3 and 3a except for the differences to be described.

In FIGURE 4 our variable actuator is shown as composed of a gudgeon plate 245 to which a stub shaft 242 is integrally connected. Gudgeon plate 245 may be connected to a free body by any suitable means. Flywheels 200 and 201 having bevel gears 220 and 221 respectively are mounted for rotation in opposite directions on the stub shaft 242 in a manner described above. In this embodiment however the flywheels do not closely abut each other as illustrated most clearly in FIGURES 3 and 3a. A space is provided in which a spider 250 is placed, the spider having an extension or ear 251 extending from one side thereof and projecting upwardly beyond the outer edges of the flanges of the flywheels. An adjuster link 252 is pivotedly attached at 253 to the projection 251 of spider 250. A pinion shaft 280 carries a pinion 261 engageable with the bevel gears 220 and 221 in the same manner as that described in FIGURES 2, 3 and 3a. Spider 250 carries pinion shaft 280 also in the same manner as above described. In this embodiment however the spider 250 is not keyed to the stub shaft 242 but is free to rotate with respect to it. The spider is restrained from rotation due to the action of the adjuster link 252 which is pivotedly attached to it and which may be set in any desired position.

Figure 6:
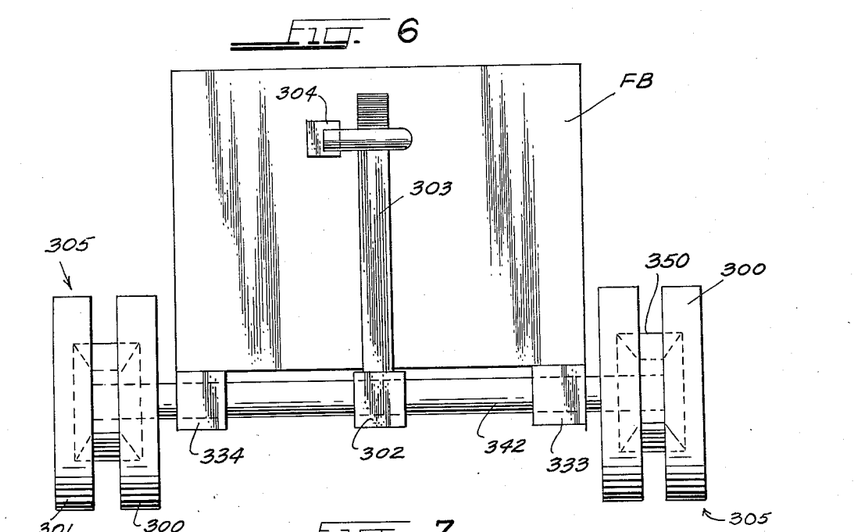
FIGURE 6 is a diagrammatic view of another arrangement of individual assemblies whereby a uniform vibratory effect may be produced simultaneously with two or more actuators.

In FIGURE 6 we have shown a third embodiment of our invention in which the parts corresponding to those shown in FIGURES 2, 3 and 3a are indicated with like numerals and the prefix 300 wherever possible. In this form of our invention a pair of actuator units 305 are shown mounted upon a common shaft 342. Each unit consists of a pair of flywheels 300 and 301 internally receiving a spider 350 that carries a pinion gear engaging bevel gears carried by the flywheels. The spiders 350 are keyed to the common shaft 342 as shown in FIGURE 2. FB represents any suitable free body and 334 and 333 are a pair of bearings attached thereto in which the common shaft 342 is revolvably received. At any convenient point along the shaft 342 is a shaft regulating means consisting of a handle 303 and a connecting member 302 rigidly connecting the handle and the shaft. Any suitable handle adjuster unit 304 may be used to adjust the position of handle 303 and rigidly hold it in position.

Figure 7:
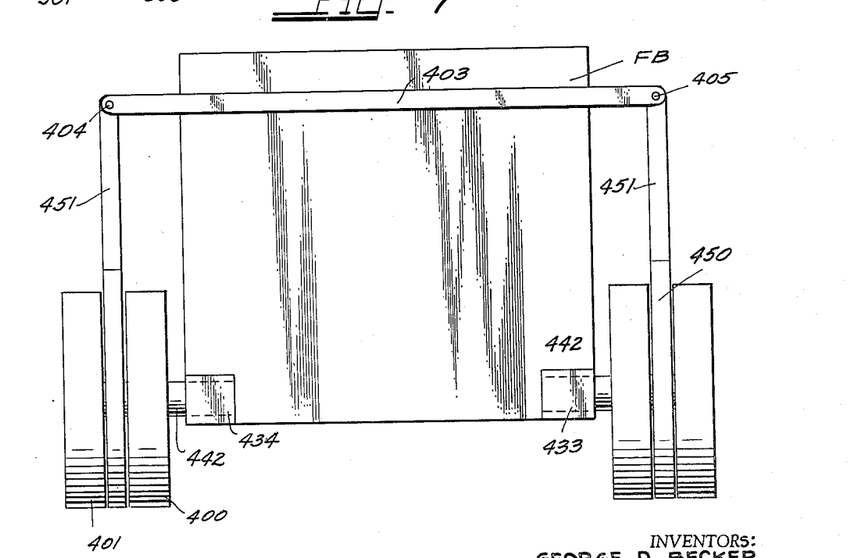
FIGURE 7 is a diagrammatic view of a fourth embodiment of our invention showing an arrangement whereby a uniform effect may be produced by a plurality of actuators in a constant manner.

In FIGURE 7, we have shown a fourth embodiment of our invention in which like parts are indicated by similar reference numerals preceded by prefix 400 wherever possible. In this embodiment a pair of stub shafts 442 are rigidly mounted in suitable bearings 434 and 433 located on free body FB and extending outwardly therefrom. Rotatably mounted upon the stub shafts 442 are a pair of variable actuators each having a pair of flywheels 400 and 401 respectively. A spider 450 having a projecting ear 451 similar to the spider 250 and ear 251 shown in FIGURE 5 is mounted on each of the stub shafts 442 and the individual assemblies may for all practical purposes be the same as the embodiment described in FIGURE 5. A crossbar or regulating handle 403 is rigidly connected at 404 and 405 to the projecting ears 451 so that upon movement of handle 403 about the stub shafts 442, the spiders 450 which are not keyed to the stub shafts will be rotated in direction thus varying the positions of the pinion gears and consequently the direction of vibration.

Although in each of FIGURES 6 and 7 we have shown a handle adapted to vary the direction of vibration of a single pair of actuators, it will be apparent that a plurality of pairs of actuators may be manipulated from a common handle. In FIGURE 7 for example, a connector such as the adjuster link 252 of FIGURE 5 may be pivotedly mounted on the projecting ears 451 of the spiders 450 of actuators arranged in tandem as shown in FIGURE 1.

Figure 8:
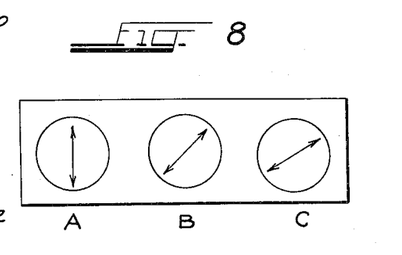
FIGURE 8 is a diagram of the direction of vibration produced by our actuator assembly in a free body.

FIGURE 8 is a schematic showing of the direction of vibration that may be produced by our variable actuator. The arrow at station A indicates direction of vibration in a vertical plane while the arrow at station B indicates a direction of vibration in a direction somewhat inclined with respect to the vertical, and the arrow at station C indicates direction of vibration in a nearly horizontal plane. When a fixed actuator is in operation the direction of vibration may be preset in any predetermined manner and that direction will be maintained throughout the operation of the actuator. Thus stations A, B and C as regards actuators in which the spider is either keyed to the common shaft or prevented from rotating by an adjuster link might represent a series of three actuators each adjusted to impart a different direction of vibration to the same free body. With respect to a variable actuator, that is one in which the spider is not keyed to the stub shaft but is free to rotate about it and is manipulatable by an external handle or bar, each of the arrows represent a different direction of motion imparted to a free body at different periods during the operation of the same actuator.

While we have shown and described a preferred embodiment of our invention and three variations, it will be understood that the illustration and description are of an illustrative nature only and a considerable change may be made in the size, shape and disposition of parts, without departing from the scope of our invention.

The use and operation of our invention are as follows:

Referring now particularly to FIGURES 2, 3 and 3a, the description of our invention as described and shown may be characterized as fixed in operation. In general, once the weights are preset they will produce a vibration that varies in amplitude and magnitude directly in response to the size of the individual weights.

The direction of vibration will be determined by the setting of the bevel and pinion gears in relation to weights 106 and 107 when the actuator is assembled. Thus when the assembly shown in FIGURES 3 and 3a is made, flywheel 100 will be placed over the stub shaft 42 and then the spider 50 will be placed next to it with the teeth on the bevel gear 120 engaging the teeth on the pinion. The spider 50 is then fixed with respect to the stub shaft 42 by the means of key 51. Flywheel 101 is then placed over the stub shaft 42 with the teeth of its bevel gear 121 engaging the teeth of pinion gear 61. The direction of vibration is determined during this assembly operation. That is, in order to produce a vibration in a vertical direction, the flywheels will be positioned so that the weights 107 and 106 will be assembled in a position 180° from each other in a horizontal direction, or coincident with each other in a vertical position. When power from a suitable source through a cog belt is delivered to the power connection 170, flywheel 100 will be rotated in one direction and flywheel 101 will be rotated in an opposite direction due to the pinion gear 61. Once the flywheels have been set the direction of vibration is fixed and to change direction the power drive need only be disconnected and flywheel 101 loosened and rotated to a position which will give the desired direction of vibration.

The amplitude and magnitude of vibration will be determined by the size of the weights, for the vibration effect is produced by the coincidence of the force of the revolving weights. Since the force is a function of the weights on the flywheels and the radius of the center of gravity of rotation of the weights, it is apparent that a wide range of amplitude and magnitude may be produced by interchangeability of entire flywheels, or individual weights of each flywheel, and variation of the speed of rotation through a choice of suitable gear ratios. In the embodiment shown, one weight is associated with each flywheel, and during one complete simultaneous revolution of each flywheel, the weights will twice coincide and twice lie in a 180° position with respect to one another. When they coincide, the forces add, and when 180° to each other the forces balance out or offset one another. A direction of vibration is thereby produced lying along a line drawn between the points of coincidence of the weights.

With respect to FIGURES 4 and 5, the direction of vibration will be determined only approximately by the setting of the bevel gears 220 and 221 with respect to the pinion gear 261. In this embodiment in which the spider 250 is not rigidly connected to the stub shaft 242, the direction of vibration may be changed during the operation. That is, as the position of the pinion gear 261 changes with respect to the stub shaft 242, while the bevel gears 220 and 221 remain engaged with the pinion gear 261, the direction of vibration will be correspondingly varied. As the adjuster link 252 is moved back and forth, the spider with its pinion gear 261 attached thereto will be correspondingly rotated about the stub shaft 242 and the direction of the vibration will be correspondingly positioned. It will be understood that adjuster link 252, while it may be put in constant motion during the operation of the actuator, will be usually preset to a given position and anchored with respect thereto during the course of the operation. Thus, with respect to FIGURE 8, the stations A, B and C may represent first the positions and the directions of vibration taken by one actuator assembly, during one operation, due to a movement of the adjuster link 252 while the power source is connected to one of the flywheels. FIGURE 8 may secondly indicate the position of three separate actuator assemblies in operation simultaneously each of which has been set to the indicated direction of vibration, and fixed therein by the key 51 or link 252 before the commencement of the operation.

The manner of positioning the direction of vibration in the embodiment shown in FIGURE 6 by rotation of common shaft 342 through movement of the handle 303 is somewhat similar to that shown in FIGURE 5. The handle 303 may be moved throughout the operation or it may be set in position by a suitable positioning device 304 from operation to operation.

In FIGURE 7 it will be apparent that the direction of vibration of the two assemblies may be simultaneously varied by manipulation of the handle 403, the ends of the handle being attached to the extension ear 451 and the spider 450. The direction of vibration may be changed before the commencement of operation or between successive operations. While it would be possible to preset the directions of vibration of the pair of actuator assemblies in the form of our invention shown in FIGURES 6 and 7 so that the directions of vibration will not be the same, it will be more practical in the large majority of cases to preset the direction of vibration in alignment so that a gradually changing direction of vibration will be produced throughout the free body by the use of more than one pair of actuators.

Our actuator assembly is characterized by an extremely long life in operation with corresponding savings in replacement of parts and labor. An especially important feature of our actuator is the fact that the weights especially in the embodiments shown in FIGURES 3 and 6 can be positioned very close to one another. Thus, the clearance between flywheels may be on the order of one-sixteenth of an inch or less. Due to this extremely small clearance little or no bending moment is produced in the stub shaft 42 during rotation. The constant bending moment produced in a shaft tends to produce fatigue failure, which noticeably decreases the useful length of life of the machine and involves a great danger to workmen if failure should occur during operation.

Similarly our device is especially adapted for use in multiple operations. One or more actuators may be placed in series to operate an adjacent one. One of the series may in turn be run from a common source of power, and a variety of directions of vibration may thus be produced in a single free body. In a screen assembly, for example, a sorting or classifying action may be produced at the feed end of the screen by an actuator set for vertical vibrations and a conveying action may be produced at the discharge end of the screen by a vibrator set for horizontal motion. The reciprocation of the material to be treated in a vertical direction thus produces a maximum separation and the horizontal motion at the discharge end of the screen gives a conveying effect which thereby passes the retained material off. Any number of actuators may be used at intermediate settings to promote the action.

The direction of vibration may be fixed before commencement of the day's operation by keying the spider to the shaft or by rigidly fixing the adjusting link if the spider is rotatable about the shaft. A rapid change in the direction of rotation may be produced either during or between successive operations when using the embodiments shown in FIGURES 4, 5, 6 and 7 by manipulation of the adjusting links or handles.

While many variations may be made in the form, shape and arrangement of the parts of our invention, we do not wish to be limited except by the scope of the following appended claims.

We claim:

1. A screening assembly or the like for use in screening, separating or similar applications including a screen and at least two actuators secured along one side thereof, said actuators each comprising a pair of weights mounted for opposite rotation about a common shaft projecting outwardly from and carried by the assembly whereby the forces produced by the revolving weights complement and oppose each other twice per revolution, power means for driving a weight on one actuator in a predetermined direction, flexible drive means connecting said weight with a weight on said second actuator to drive said second weight in the same direction, and means for driving the other weight on each actuator in the opposite direction.

2. A screening assembly or the like for use in screening, separating or similar applications in which the assembly is supported as a free body including a screen and at least two actuators secured along one side thereof, said actuators each comprising a pair of weights mounted for opposite rotation about a common shaft projecting outwardly from and carried by the assembly whereby the forces produced by the revolving weights complement and oppose each other twice per revolution, the points of complementary force and opposing force being disposed 90 degrees to each other, power means for driving a weight on one actuator in a predetermined direction, a flexible belt connecting said weight with the corresponding weight on said second actuator to drive said second weight in the same direction, means for driving the other weight on each actuator in the opposite direction, and means to selectively position the weights and thereby the points of complementary and opposing forces.

3. The structure of claim 2 further characterized by at least two actuators secured along the opposite side of said assembly, the actuators on said opposite side being driven in the same manner as the actuators on said first side by said power means.

4. The structure of claim 2 further characterized in that the means for selectively positioning the weights is effective while the weights are rotating.

References Cited in the file of this patent

UNITED STATES PATENTS

| | | |
|---|---|---|
| 1,517,587 | Roth | Dec. 2, 1924 |
| 1,943,076 | Jackson | Jan. 3, 1934 |
| 1,943,220 | Keefer | Jan. 9, 1934 |
| 2,144,382 | Lincoln et al. | Jan. 17, 1939 |
| 2,309,172 | De Kanski | Jan. 26, 1943 |
| 2,571,391 | Strawn | Oct. 16, 1951 |
| 2,599,496 | Soldan | June 3, 1952 |